US010008925B2

(12) United States Patent
Ahmed

(10) Patent No.: US 10,008,925 B2
(45) Date of Patent: *Jun. 26, 2018

(54) CONTROL ARRANGEMENT AND METHOD FOR CONTROLLING A POWER SUPPLY UNIT

(71) Applicant: University of Plymouth, Plymouth, Devon (GB)

(72) Inventor: Mohammed Ahmed, Wembury (GB)

(73) Assignee: University of Plymouth, Plymouth, Devon (GB)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/527,838

(22) PCT Filed: Nov. 17, 2015

(86) PCT No.: PCT/GB2015/053480
§ 371 (c)(1),
(2) Date: May 18, 2017

(87) PCT Pub. No.: WO2016/079492
PCT Pub. Date: May 26, 2016

(65) Prior Publication Data
US 2017/0317581 A1 Nov. 2, 2017

(30) Foreign Application Priority Data
Nov. 19, 2014 (GB) .................... 1420547.0

(51) Int. Cl.
*H02M 3/158* (2006.01)
*H02M 3/04* (2006.01)
(Continued)

(52) U.S. Cl.
CPC ............... *H02M 3/04* (2013.01); *H02S 40/30* (2014.12); *H02J 3/385* (2013.01)

(58) Field of Classification Search
CPC .............................. H02M 3/156; H02M 3/158
(Continued)

(56) References Cited

U.S. PATENT DOCUMENTS 6,356,035 B1    3/2002  Weng
7,768,243 B2 *  8/2010  Cuellar ................... H02M 1/34
                                                323/224

(Continued)

FOREIGN PATENT DOCUMENTS

EP        2230754 A1    9/2010

OTHER PUBLICATIONS

Search Report for United Kingdom Patent Application No. GB1420547.0 dated Jun. 10, 2015.
(Continued)

*Primary Examiner* — Jeffrey Sterrett
(74) *Attorney, Agent, or Firm* — Andrus Intellectual Property Law, LLP

(57) ABSTRACT

A control arrangement for use in controlling the electrical supply from a power supply unit including an internal capacitance. The control arrangement includes first and second magnetically linked inductors arranged in series with one another and defining a connection therebetween. Third and fourth magnetically linked inductors are each connected to the connection between the first and second inductors. A switch means provides switched connections between the third and fourth inductors and ground, and a controller is operable to control the operation of the switch means such that closing of a switch of the switch means results in the formation of an LCR circuit. The internal capacitance forms the capacitance of the LCR circuit and the third or fourth inductor form the inductance of the LCR circuit. The mag- (Continued)

netic link between the third and fourth inductors allow an output to be generated from the other of the third and fourth inductors.

14 Claims, 1 Drawing Sheet

(51) Int. Cl.
*H02S 40/30* (2014.01)
*H02J 3/38* (2006.01)

(58) Field of Classification Search
USPC .................................. 323/222, 271, 906
See application file for complete search history.

(56) References Cited

U.S. PATENT DOCUMENTS

| | | | |
|---|---|---|---|
| 8,111,053 B2* | 2/2012 | Asuke | H02M 3/1584 |
| | | | 323/225 |
| 8,368,364 B2* | 2/2013 | Asuke | H02M 1/34 |
| | | | 323/222 |
| 8,878,500 B2* | 11/2014 | Jeong | G05F 1/70 |
| | | | 323/225 |
| 9,570,981 B2* | 2/2017 | Terui | H02M 3/158 |
| 9,742,290 B2* | 8/2017 | Ahmed | H02J 3/385 |
| 2004/0113596 A1 | 6/2004 | Peron | |
| 2010/0061122 A1 | 3/2010 | Okubo et al. | |
| 2010/0237843 A1 | 9/2010 | Rivet et al. | |
| 2014/0016370 A1 | 1/2014 | Chandrasekaran | |
| 2017/0317581 A1* | 11/2017 | Ahmed | H02M 3/04 |

OTHER PUBLICATIONS

Weiman Wu et al.: "A composite passive damping method of the LLCL-filter based grid-tied inverter", Power Electronics for Distributed Generation Systems (PEDG), 2012 3rd IEEE International Symposium on, IEEE. Jun. 25, 2012. pp. 759-766.

Boris Reznikov et al.: "Four-level single-leg flying capacitor converter voltage balance dynamics analysis", 13th European Conference on Power Electronics and Applications, 2009: EPE '09; Sep. 8-10, 2009. Barcelona, Spain. pp. 1-10.

International Search Report and Written Opinion for International Application No. PCT/GB2015/053480 dated Feb. 8, 2016.

* cited by examiner

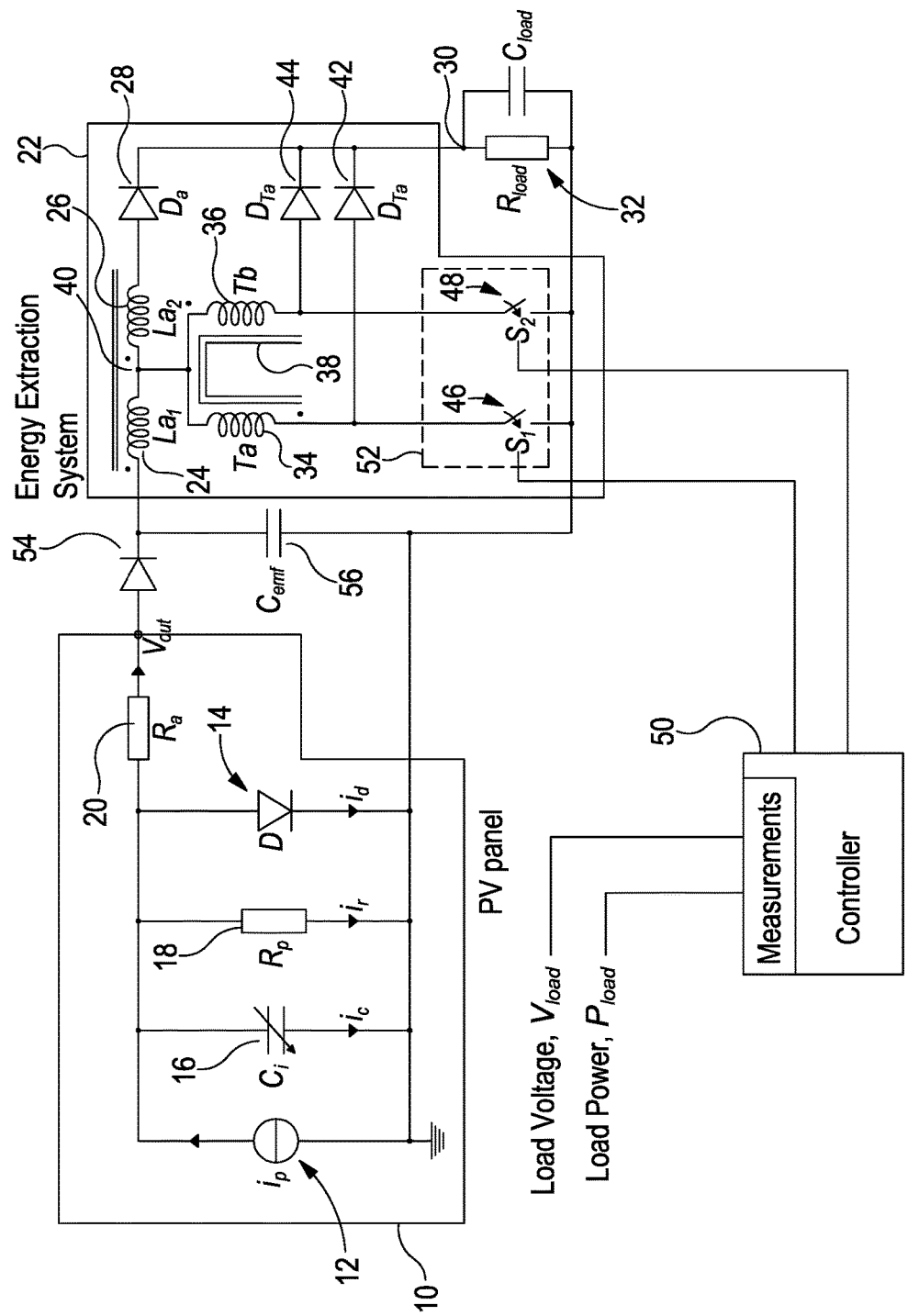

CONTROL ARRANGEMENT AND METHOD FOR CONTROLLING A POWER SUPPLY UNIT

CROSS-REFERENCE TO RELATED APPLICATIONS

This application is the U.S. national stage application of International Application PCT/GB2015/053480, filed Nov. 17, 2015, which international application was published on May 26, 2016, as International Publication WO 2016/079492 in the English language. The International Application claims priority of United Kingdom Patent Application 1420547.0, filed Nov. 19, 2014.

BACKGROUND

This invention relates to a control arrangement an in particular to a control arrangement for use in the extraction of power from a source including an internal capacitance. One application in which the invention may be used is in conjunction with a photovoltaic or solar panel. However, there are a number of other applications in which the invention may be used.

Solar panels are in increasingly widespread use in the generation of electricity. The outputs therefrom may be used directly in driving other devices, or may be used in charging electrical storage means or in supplying power to the mains electricity network. As the output of a solar panel varies, non-linearly, depending upon, for example, the intensity of the light incident thereon, the operating temperature, and other factors, the direct, uncontrolled supply of the output from the solar panel to a load is usually inappropriate as changes in the light intensity, result in the operating current and voltage required for maximum output varying. In order to ensure that the solar panel and associated circuits operate at around the point of maximum power, a maximum power point tracking algorithm is used. The output of the maximum power point tracking algorithm is used in varying the load supplied by the solar panel, for example switching in or out resistances thereof, in an attempt to maintain the operation of the solar panel at around its optimum point.

In some older systems the algorithm operates to ensure that the circuit operates at 70% of the open circuit voltage. This is achieved by repeatedly and rapidly connecting disconnecting the supply, ie the output from the solar panel, from the load. By way of example, the supply may be connected and disconnected in the region of 1000 to 3000 times per second. By disconnecting the output for a proportion of the time in this manner, the duty cycle is reduced, for example to around 70% as mentioned above.

Whilst such a system may operate satisfactorily in some circumstances, when the supply is disconnected there is no output from the panel to the load and consequently, even if the panel would otherwise be operating at the maximum power point, potential power is being lost whilst the panel is disconnected. The arrangement is therefore less efficient than it could be.

SUMMARY

It is an object of the invention to provide a control method and apparatus whereby the useful output of a solar panel or other device can be enhanced and, preferably optimised.

According to the present invention there is provided a control arrangement for use in controlling the electrical supply from a power supply unit including an internal capacitance to an output, the control arrangement comprising first and second magnetically linked inductors arranged in series with one another and defining therebetween a connection by which they are interconnected, third and fourth magnetically linked inductors each being connected to the connection between the first and second inductors, switch means providing switched connections between the third and fourth inductors and ground, and a controller operable to control the operation of the switch means such that closing of a switch of the switch means results in the formation of an LCR circuit, the internal capacitance forming the capacitance of the LCR circuit and the third or fourth inductor forming the inductance of the LCR circuit, the magnetic link between the third and fourth inductors allowing an output to be generated from the other of the third and fourth inductors. The arrangement may be used in controlling the supply from, for example, a solar panel or the like to an electricity supply or distribution network or grid, in which case the resistor of the LCR circuit may comprise the load formed by the network or grid.

In such an arrangement there is no need to provide a maximum power point tracking algorithm or the like, and preferably no such algorithm or the like is present.

A pn junction diode, by its nature, forms a variable junction capacitance. Such a diode is typically present in a unit including a solar panel. This junction capacitance has, in the past, been ignored when modelling the output of a solar panel and associated control circuit. Where such a diode is arranged in parallel with a voltage source such as a solar panel, part of the supply is used, initially, in charging the junction capacitance. Furthermore, where the voltage source takes the form of a solar panel, the source itself will in effect form a capacitance which will also become charged. As the potential difference of a solar panel is not uniform but varies with, for example, incident light intensity, temperature and other factors, the charge on the capacitance(s) is constantly varying. The capacitor current associated with the internal capacitance can thus either be positive or negative depending upon whether, at any given point in time, the capacitance is being charged or is discharging. In a conventionally arranged solar panel, the direction of this current will depend upon, for example, whether the intensity of the illumination is increasing or decreasing. However, in the arrangement outlined hereinbefore, extraction of the internal capacitance energy is achieved through the operation of the switch means in a controlled manner, thereby allowing the operation of the overall system with an enhanced level of efficiency.

In the arrangement of the invention, when both of the switches of the switch means are open, the internal capacitance of the unit will charge. Closing of one of the switches will result in discharge of the internal capacitance into the first inductor. By appropriate control over the operation of the switch it will be appreciated that the output from the power supply unit which would otherwise just go towards charging of the internal capacitance thereof can instead be extracted for use. When the switch means is opened again, resulting in the internal capacitance recharging, energy can be extracted from the first inductor via the second inductor and used to satisfy the demands of a load connected thereto.

When one or other of the switches of the switch means is closed, the current flow through the associated one of the third and fourth inductors results in the generation of a current in the other of the third and fourth inductors, which can be extracted and used to satisfy the load. During this phase of the operation, the output current from the power supply unit flows through the first inductor resulting in energy storage therein so that when the switch is re-opened, power is supplied to the load. As long as the output current from the power supply is supplied continuously to the first inductor, and the inductor current rises upon closing of the switch means and decreases upon opening of the switch means, the output voltage from the control arrangement will be greater than then input voltage thereto.

Preferably, the controller causes the switches of the switch means to move between their respective opened and closed positions at a frequency in the range of 150-700 kHz, preferably 600-700 kHz, for example at a frequency of the order of 650 kHz. Variation of the size of the inductances changes the frequency at which the switch should be operated.

Where the power supply unit includes an inverter, such as a string inverter or a microinverter used in conjunction with a solar panel, the control arrangement may be incorporated into the inverter or may comprise a module adapted for connection thereto.

The invention further relates to a method for controlling the output of unit using a control arrangement of the form outlined hereinbefore, the method comprising the steps of:
  opening the switches of the switch means, thereby allowing the internal capacitance of the unit to become charged;
  closing a switch of the switch means, thereby allowing the internal capacitance of the unit to discharge, supplying an increased current to the first inductor and through one of the third and fourth inductors, generating a current in the other of the third and fourth inductors to satisfy the electrical demand of a load; and
  re-opening the switch of the switch means, thereby allowing the internal capacitance of the unit to become recharged. Preferably during this phase in the operation the output current from the supply is choked.

BRIEF DESCRIPTION OF THE DRAWINGS

The invention will further be described, by way of example, with reference to the accompanying drawing, FIG. 1, which is a circuit diagram illustrating a control arrangement in accordance with an embodiment of the invention.

DETAILED DESCRIPTION OF THE DRAWINGS

Referring to FIG. 1, a photovoltaic or solar panel 10 is shown which includes a plurality of photovoltaic cells 12, having a pn junction diode 14 connected across the terminals thereof. The diode 14 has an internal capacitance. The cells 12 will also have an internal diffusion capacitance associated therewith. These capacitances are denoted in FIG. 1 by the variable internal capacitance 16. Resistances 18, 20 reflect resistances present within the panel 10. $V_{out}$ as indicated in FIG. 1 is indicative of the output voltage of the panel 10. Depending upon, for example, the light intensity incident upon the panel 10, the ambient temperature, and other factors, the value of $V_{out}$ will vary.

The output from the panel 10 is supplied to a control arrangement 22 in the form of an energy extraction circuit. The control arrangement 22 comprises a first inductor 24 connected in series with a second inductor 26. The first and second inductors 24, 26 take the form of coils wound upon a common core with the result that the first and second inductors 24, 26 are magnetically linked. The output from the second inductor 26 is supplied via a diode 28 to an output terminal 30 to which a load 32 is connected. Where the arrangement is used to supply electrical energy to an electrical supply or distribution network or grid, then the load 32 may represent the network or grid.

The control arrangement 22 further comprises third and fourth inductors 34, 36 in the form of coils wound upon a common core 38 such that the third and fourth inductors 34, 36 are magnetically linked with one another. The third and fourth inductors 34, 36 are both electrically connected to a point 40 at which the first and second inductors 24, 26 are electrically connected to one another. The ends of the third and fourth inductors 34, 36 remote from the point 40 are connected via respective diodes 42, 44 with the output terminal 30 and load 32.

The end of each of the third and fourth inductors 34, 36 remote from the point 40 is provided with a switched connection to ground via switch means 52 including switches 46, 48, the operation of which is controlled by a controller 50.

In use, starting from a position in which the controller 50 controls the switch means 52 such that the switch 46 is closed and the switch 48 is open, it will be appreciated that the internal capacitance 16 is able to discharge through the first inductor 24, setting up a magnetic field in the core of the first and second inductors 24, 26, and through the third inductor 34 to ground. The magnetically linked third and fourth inductors 34, 36 act in a manner similar to a transformer, the current flow through the third inductor 34 to ground inducing a current in the fourth inductor 36 that is supplied via the diode 44 to the terminal 30 and load 32.

Upon opening the switch 46, the output via the diode 44 is cease, and the magnetic linking of the first and second inductors 24, 26 forces the current supplied via inductors 24, 26 and the diode 28 to the terminal 30 and load 32 to be much reduced, this choking action forcing the panel 10 into a low current state, increasing the storage of power within the internal capacitance which, as the switches 46, 48 are both open, recharges.

Subsequently, the switch 48 is closed whilst the switch 46 remains open. As a consequence, the internal capacitance 16 is discharged again, this time via the fourth inductor 36, resulting in the generation of an output in the third inductor 34 which is supplied via the diode 42 to the terminal 30 and load 32. After discharge of the internal capacitor 16 in this fashion, the switch 48 is reopened with the result that the first and second inductors 24, 26 serve to choke the panel 10 as outlined hereinbefore.

By way of example, when the switch 46 is closed, if a current $i_a$ flows in the third inductor 34, an equal current will be induced in the fourth inductor 36 if the inductors are identical. The current through the first inductor 24 must therefore be $2i_a$ and the energy stored therein will be $2L_{a1}i_a^2$ where $L_{a1}$ is the inductance of the first inductor 24. When the switch 46 is opened, the combined inductance $L_a$ formed by the first and second inductors 24, 26 allows a current $i_c$ to flow. From energy conservation:

$$2L_{a1}i_a^2 = L_a i_c^2/2$$

which can be written as:

$$i_c = i_a \sqrt{/(4L_{a1}/L_a)}$$

Preferably, the inductance of the second inductor 26 is greater than that of the first inductor 24 with the result that $L_a$ is significantly greater than $L_{a1}$. As a result, $i_c$ will be significantly lower than $i_a$. By way of example, the inductance of the second inductor 26 may be several times that of the first inductor 24, for example 2 to 4 times that of the first inductor 24, but it may be preferred for it to be greater than this in some embodiments, for example it may be 10 to 20 times the inductance of the first inductor 24. The current flowing when the switch means 52 is open is thus choked to a low level, compared to that when one of the switches 46, 48 is closed.

Clearly, with one or other of the switches 46, 48 closed, once the internal capacitance 16 has discharged, or partially discharged, the output to the terminal 30 and load 32 will fall. In order to maintain the output at a desired level or within a desired range, therefore, the controller 50 preferably controls the operation of the switches 46, 48 such that each switch is closed only for a very short period of time. By way of example, the switching frequency of the switches 46, 48 is preferably in the range of 150 to 700 kHz, preferably 600-700 kHz. By way of example, the switching frequency may be in the region of 650 kHz. It will be appreciated, however, that the switching frequency may depend upon the size of the internal capacitance 16, bearing in mind that the internal capacitance will vary depending upon, for example, the light intensity to which the panel 10 is exposed, the ambient temperature and a number of other factors.

It is envisaged that the various inductors may be fairly small, each taking the form of, for example, a small number of windings, wound upon the associated cores. As the inductors may be fairly small and of simple form, it will be appreciated that the component costs associated with the control arrangement may be kept to a very low level.

In FIG. 1, a diode 54 and capacitor 56 are provided to prevent back emf damage to the panel 10 and control arrangement 22. However, in practise, back emf levels are very low and so the risk of such damage is minimal. It is envisaged, therefore, that arrangements will be possible in which these components are omitted.

The use of the control arrangement outlined hereinbefore is advantageous in that it allows the useful output of the solar panel 10 to be enhanced whilst avoiding the need to employ a complex maximum power point tracking algorithm, and avoiding the inefficiencies associated therewith. As the control arrangement allows the useful output of the panel 10 to be increased, it may allow panels 10 to be installed in locations in which, typically, it is thought that the output would be insufficient for the panel 10 to be viable. The control arrangement is preferably located close to the panel 10 to minimize the effects of inductances associated with the connecting cables. It could, for example, be incorporated into an inverter such as a string inverter or microinverter associated with the panel 10, or as a module to be connected thereto. Heat generation within the control arrangement 22 is very low. As a result, if the control arrangement 22 is attached to or located close to the panel 10, the heat output of the control arrangement 22 will not significantly impact upon the operation of the panel 10.

Whilst specific embodiments of the invention are described hereinbefore, it will be appreciated that a number of modifications and alterations to the arrangement may be made without departing from the scope of the invention. Specifically, whilst the description hereinbefore is concerned primarily with enhancing the useful output of a solar panel, the invention is not restricted in this regard and may be used in a range of other applications in which a source includes an internal capacitance or has a capacitance associated therewith.

The invention claimed is:

1. A control arrangement for use in controlling the electrical supply from a power supply unit including a capacitance to an output, the control arrangement comprising first and second magnetically linked inductors arranged in series with one another and defining therebetween a connection by which they are interconnected, third and fourth magnetically linked inductors each being connected to the connection between the first and second inductors, switch means providing switched connections between the third and fourth inductors and ground, and a controller operable to control the operation of the switch means such that closing of a switch of the switch means results in the formation of an LCR circuit, the capacitance of the power supply unit forming the capacitance of the LCR circuit and the first inductor in combination with the third or fourth inductor forming the inductance of the LCR circuit, the magnetic link between the third and fourth inductors allowing an output to be generated from the other of the third and fourth inductors.

2. The control arrangement according to claim 1, wherein the capacitance is formed, at least in part, by an internal capacitance of the supply unit.

3. The control arrangement according to claim 1, wherein the power supply unit includes a pn junction diode forming, at least in part, the capacitance.

4. The control arrangement according to claim 1, wherein the power supply unit comprises a solar panel.

5. The control arrangement according to claim 1, wherein the switch means comprises two switches, one associated with the third inductor and one associated with the fourth inductor.

6. The control arrangement according to claim 5, wherein when both of the switches of the switch means are open, the internal capacitance of the unit will charge.

7. The control arrangement according to claim 1, wherein the controller causes the switches of the switch means to move between their respective opened and closed positions at a frequency in the range of 150-700 kHz.

8. The control arrangement according to claim 7, wherein the switching frequency is in the range of 600-700 kHz.

9. The control arrangement according to claim 1, wherein the third and fourth inductors are substantially identical.

10. The control arrangement according to claim 1, wherein the second inductor is of larger inductance than the first inductor.

11. The control arrangement according to claim 10, wherein the second inductor is of inductance at least twice the inductance of the first inductor.

12. The control arrangement according to claim 1, and arranged to supply electrical energy to an electrical supply or distribution network or grid, which forms the resistance of the LCR circuit.

13. A control method for controlling the output of unit using a control arrangement as claimed in claim 1, the method comprising the steps of:
    opening the switch of the switch means, thereby allowing the internal capacitance of the unit to become charged;
    closing the switch of the switch means, thereby allowing the internal capacitance of the unit to discharge, supplying an increased current to the first inductor and through one of the third and fourth inductors, generating a current in the other of the third and fourth inductors to satisfy the electrical demand of a load; and
    re-opening the switch of the switch means, thereby allowing the internal capacitance of the unit to become recharged.

14. The control method according to claim 13, wherein re-opening of the switch means results in choking of the current supplied by the power supply unit.

* * * * *